US009642104B2

(12) United States Patent
Nakao et al.

(10) Patent No.: US 9,642,104 B2
(45) Date of Patent: *May 2, 2017

(54) INTEGRATED CIRCUIT FOR DOWNLINK DATA AND CONTROL COMMUNICATION

(71) Applicant: Sun Patent Trust, New York, NY (US)

(72) Inventors: Seigo Nakao, Singapore (SG); Hidetoshi Suzuki, Kanagawa (JP); Akihiko Nishio, Osaka (JP); Takahisa Aoyama, Kanagawa (JP); Katsuhiko Hiramatsu, Kanagawa (JP)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/166,089

(22) Filed: May 26, 2016

(65) Prior Publication Data
US 2016/0309432 A1 Oct. 20, 2016

Related U.S. Application Data

(63) Continuation of application No. 14/697,477, filed on Apr. 27, 2015, now Pat. No. 9,380,547, which is a (Continued)

(30) Foreign Application Priority Data

Aug. 4, 2008 (JP) ................................. 2008-201005

(51) Int. Cl.
*H04W 56/00* (2009.01)
*H04L 5/00* (2006.01)
(Continued)

(52) U.S. Cl.
CPC ........... *H04W 56/001* (2013.01); *H04L 5/001* (2013.01); *H04L 5/0023* (2013.01); (Continued)

(58) Field of Classification Search
CPC ..... H04L 5/0053; H04L 5/001; H04L 5/0007; H04W 72/042; H04W 72/0406; H04W 72/0413
See application file for complete search history.

(56) References Cited

U.S. PATENT DOCUMENTS 7,860,050 B2 * 12/2010 Cho ..................... H04W 72/005
370/328
7,983,292 B2 * 7/2011 Higuchi .............. H04L 27/2655
370/442
(Continued)

FOREIGN PATENT DOCUMENTS

EP    1 819 069 A2    8/2007
EP    1 976 168 A1    10/2008
(Continued)

OTHER PUBLICATIONS

"3rd Generation Partnership Project; Technical Specification Group Radio Access Network; Evolved Universal Terrestrial Radio Access (E-UTRA); Physical Channels and Modulation (Release 8)," 3GPP TS 36.211 V8.3.0, Technical Specification, May 2008, 77 pages.
(Continued)

*Primary Examiner* — Charles C Jiang
*Assistant Examiner* — Oussama Roudani
(74) *Attorney, Agent, or Firm* — Seed IP Law Group LLP

(57) ABSTRACT

Provided are a base station, a terminal, a band allocation method, and a downlink data communication method in which a mapping method for synchronization signals and report signals is implemented with high resource usage efficiency when a first system in which an independent single communication is allocated to a unit band co-exists with a second system in which a plurality of unit bands can be allocated to a single communication. In a base station, an OFDM signal generation unit maps primary synchronization channel (P-SCH), secondary synchronization channel
(Continued)

(S-SCH), primary broadcast channel (P-BCH), and dynamic broadcast channel (D-BCH), which can be decoded by both an LTE terminal and an LTE+ terminal, to some of a plurality of unit bands. The OFDM signal generation unit also maps D-BCH+, which can be decoded only by an LTE+ terminal, to all of the plurality of unit bands to produce a multiplexed transmission signal.

14 Claims, 9 Drawing Sheets

Related U.S. Application Data continuation of application No. 14/550,848, filed on Nov. 21, 2014, now Pat. No. 9,049,705, which is a continuation of application No. 13/056,615, filed as application No. PCT/JP2009/003681 on Aug. 3, 2009, now Pat. No. 8,971,260.

(51) Int. Cl.
*H04L 27/26* (2006.01)
*H04W 72/04* (2009.01)

(52) U.S. Cl.
CPC .......... *H04L 5/0048* (2013.01); *H04L 5/0053* (2013.01); *H04L 27/2601* (2013.01); *H04L 27/2647* (2013.01); *H04W 72/042* (2013.01); *H04W 72/048* (2013.01); *H04W 72/0413* (2013.01); *H04W 72/0493* (2013.01); *H04W 72/0406* (2013.01)

(56) References Cited

U.S. PATENT DOCUMENTS

| | | | |
|---|---|---|---|
| 8,971,260 B2* | 3/2015 | Nakao | H04L 5/0053 370/252 |
| 9,049,705 B2* | 6/2015 | Nakao | H04L 5/0053 |
| 9,380,547 B2* | 6/2016 | Nakao | H04L 5/0053 |
| 2006/0077923 A1* | 4/2006 | Niwano | H04W 72/1278 370/328 |
| 2007/0093253 A1 | 4/2007 | Lindoff et al. | |
| 2007/0217440 A1 | 9/2007 | Cho et al. | |
| 2009/0003477 A1 | 1/2009 | Nishio et al. | |
| 2009/0219860 A1 | 9/2009 | Tanno et al. | |
| 2010/0128675 A1* | 5/2010 | Kishiyama | H04L 5/0007 370/328 |
| 2011/0051711 A1 | 3/2011 | Kishiyama et al. | |
| 2011/0075750 A1 | 3/2011 | Miki et al. | |
| 2011/0143796 A1* | 6/2011 | Lee | H04L 1/0038 455/507 |
| 2012/0140720 A1 | 6/2012 | Nishio et al. | |

FOREIGN PATENT DOCUMENTS

| | | |
|---|---|---|
| JP | 2007-194868 A | 8/2007 |
| JP | 2007-325237 A | 12/2007 |
| JP | 2009-246501 A | 10/2009 |
| WO | 95/10161 A1 | 4/1995 |
| WO | 2007/042425 A1 | 4/2007 |
| WO | 2007/080892 A1 | 7/2007 |
| WO | 2009/119834 A1 | 10/2009 |

OTHER PUBLICATIONS

"3rd Generation Partnership Project; Technical Specification Group Radio Access Network; Evolved Universal Terrestrial Radio Access (E-UTRA); Multiplexing and channel coding (Release 8)," 3GPP TS 36.212 V8.3.0, Technical Specification, May 2008, 48 pages.

"3rd Generation Partnership Project; Technical Specification Group Radio Access Network; Evolved Universal Terrestrial Radio Access (E-UTRA); Physical layer procedures (Release 8)," 3GPP TS 36.213 V8.3.0, Technical Specification, May 2008, 45 pages.

Ericsson, "Carrier aggregation in LTE-Advanced," R1-082468, TSG-RAN WG1 #53bis, Agenda Item: 12, Warsaw, Poland, Jun. 30-Jul. 4, 2008, 6 pages.

Extended European Search Report, dated Dec. 15, 2014, for corresponding European Application No. 09804708.7-1851 / 2312874, 9 pages.

Fujitsu, "Anchor component carrier," R1-090382, 3GPP TSG-RAN1 #55bis, Agenda Item: 12.2, Ljubljana, Slovenia, Jan. 12-16, 2008, 2 pages.

Harman, "LTE Paging Process," NT&C Radio, GSDC Australia, Version PA1, Oct. 30, 2008, 43 pages.

International Search Report, mailed Nov. 10, 2009, for International Application PCT/JP2009/003681, 4 pages.

Japanese Notice of the Reasons for Rejection dated Mar. 17, 2015, for corresponding JP Application No. 2014-126136, 3 pages.

"Long Term Evolution Protocol Overview," White Paper, Freescale Semiconductor, Oct. 2008, 21 pages.

NCHU CSE LTE, "Downlink L1/L2 Control Signaling," 38 pages.

NTT DoCoMo, Inc., "Proposals for LTE-Advanced Technologies," R1-081948, Agenda Item: 6.2, 3GPP TSG RAN WG1 Meeting #53, Kansas City, USA, May 5-9, 2008, 29 pages.

NTT DoCoMo, Inc., "Proposals for LTE-Advanced Technologies," R1-082575, Agenda Item: 12, 3GPP TSG RAN WG1 Meeting #53bis, Warsaw, Poland, Jun. 30-Jul. 4, 2008, 36 pages.

Panasonic, "Technical proposals and considerations for LTE advanced," R1-081791, 3GPP TSG RAN WG1 Meeting #53, Kansas City, USA, May 5-9, 2008, 17 pages.

Russian Office Action, for corresponding Russian Application No. 2011103904/07 (005395), 5 pages.

Samsung, NTT DoCoMo, Panasonic, Qualcomm, "UL ACK/NACK resource indication for DL persistent scheduling," R1-080681, 3GPP TSG RAN WG1 Meeting #52, Agenda Item: 6.1.4, Sorrento, Italy, Feb. 11-15, 2008, 3 pages.

* cited by examiner

INTEGRATED CIRCUIT FOR DOWNLINK DATA AND CONTROL COMMUNICATION

BACKGROUND

Technical Field

The present invention relates to a base station, terminal, band assignment method and downlink data communication method.

Description of the Related Art

In 3GPP LTE, OFDMA (Orthogonal Frequency Division Multiple Access) is adopted as a downlink communication scheme. In a radio communication system adopting 3GPP LTE, a radio communication base station apparatus (which may be simply referred to as "base station" below) transmits a synchronization channel ("SCH") or broadcast channel ("BCH") using predetermined communication resources. Then, first, a radio communication terminal apparatus (which may be simply referred to as "terminal" below) maintains synchronization with the base station by receiving the SCH. That is, first, the terminal performs a cell search. After that, the terminal obtains parameters unique to the base station (such as a frequency bandwidth) by reading the BCH information (see Non-Patent Literatures 1, 2 and 3).

Also, standardization of 3GPP LTE-advanced, which realizes faster communication than 3GPP LTE, has been started. The 3GPP LTE-advanced system (which may be referred to as "LTE+ system" below) follows the 3GPP LTE system (which may be referred to as "LTE system" below). In 3GPP LTE-advanced, to realize the downlink transmission speed equal to or greater than maximum 1 Gbps, it is expected to adopt a base station and terminal that can perform communication in a wideband frequency equal to or greater than 20 MHz. Here, to prevent unnecessary complication of the terminal, the terminal side is expected to define the terminal capability related to frequency band support. The terminal capability defines that, for example, the minimum value of support bandwidth is 20 MHz.

CITATION LIST

Non-Patent Literature

[NPL 1]
3GPP TS 36.211 V8.3.0, "Physical Channels and Modulation (Release 8)," May 2008
[NPL 2]
3GPP TS 36.212 V8.3.0, "Multiplexing and channel coding (Release 8)," May 2008
[NPL 3]
3GPP TS 36,213 V8.3.0, "Physical layer procedures (Release 8)," May 2008

BRIEF SUMMARY

Technical Problem

Here, a case is assumed where a base station supporting an LTE+ system (which may be referred to as "LTE+ base station") supports a terminal supporting an LTE system (which may be referred to as "LTE terminal"). Also, the LTE+ base station is formed to be able to perform communication in a frequency band including a plurality of "unit bands." Here, a "unit band" is a band of a 20-MHz range including SCH (Synchronization CHannel) near the center and is defined as a base unit of a communication band. Also, a "unit band" may be expressed as "component carrier(s)" in English in 3GPP LTE.

FIG. 1 shows an example of mapping SCH and BCH in the LTE+ system support base station.

In FIG. 1, a communication bandwidth of the LTE+ base station is 60 MHz and includes three unit bands. Also, SCH and BCH, which cannot be interpreted by an LTE terminal, are placed at 20 MHz intervals near the center frequency of each unit band. Also, a physical downlink control channel (PDCCH) is placed over each unit band in a distributed manner.

By adopting such a mapping method, an LTE terminal of only 20-MHz terminal capability can find synchronization with the LTE+ base station if this terminal camps in any unit band, and start communication by reading a BCH. Also, a unit band with which synchronization is found between the terminal and the base station may be referred to as "initial access unit band." Also, a BCH includes frequency band information, which divides a communication band every unit band. In view of the above, a unit band is also defined as a band divided using frequency band information in a BCH or a band defined by a distribution width upon placing a PDCCH in a distributed manner.

By the way, an LTE+ base station needs to support an LTE+ system support terminal (which may be referred to as "LTE+ terminal" below) in addition to the above LTE terminal. Similar to the LTE terminal, the LTE+ terminal includes a terminal having terminal capability of only the same communication bandwidth as a unit band, and a terminal having terminal capability of a communication bandwidth combining a plurality of unit bands.

That is, actually, an integrated communication system including the LTE system in which single communication is independently assigned every unit band and the LTE+ system which follows the LTE system and in which a plurality of unit bands can be assigned in single communication.

In this integrated communication system, the LTE+ base station needs to map a synchronization signal and broadcast signal which can be interpreted by both an LTE terminal and LTE+ terminal (i.e., LTE synchronization signal and LTE broadcast signal), and a synchronization signal and broadcast signal which cannot be interpreted by the LTE terminal and which are required for the LTE+ terminal (i.e., LTE+ synchronization signal and LTE+ broadcast signal), on the support band.

However, a method of mapping a synchronization signal and broadcast signal in such a new integrated communication system is not proposed yet.

It is therefore an object of the present invention to provide a base station, terminal, band assignment method and downlink data communication method for realizing a method of mapping synchronization signals and broadcast signals having high use efficiency of resources, in a case where there are a first system in which single communication is independently assigned every unit band having a predetermined bandwidth and a second system which follows the first system and in which a plurality of unit bands can be assigned in single communication.

Solution to Problem

The base station of the present invention representing a second-system support base station in an integrated communication system including a first system in which single communication is independently assigned every unit band having a predetermined bandwidth and a second system in which single communication can be assigned a plurality of unit bands, employs a configuration having: a forming section that forms a multiplex signal by mapping a synchronization channel, first-system broadcast signal and first-system dynamic broadcast signal, which can be interpreted by a first-system support terminal and second-system support terminal, on part of the plurality of unit bands that can be used by the base station, and mapping a second-system dynamic broadcast signal that can be interpreted only by the second-system support terminal on all of the plurality of unit bands; and a transmission section that transmits the multiplex signal.

The terminal of the present invention representing a second-system support terminal that receives a data signal transmitted from the above base station in a destination unit band corresponding to a band moving indication transmitted from the base station, employs a configuration having: a receiving section that receives a second-system dynamic broadcast signal; and a control section that makes the receiving section start reception processing of the second-system dynamic broadcast signal after a start of reception processing of the data signal.

The band assignment method of the present invention whereby a second-system support base station assigns a used unit band for use in data communication to a second-system support terminal, in an integrated communication system including a first system in which single communication is independently assigned every unit band having a predetermined bandwidth and a second system in which single communication can be assigned a plurality of unit bands, includes the steps of: in an assignment target terminal, sequentially shifting a reception band and searching for a synchronization channel, which is assigned to a predetermined frequency and transmitted from the second-system support base station and which can be interpreted by a first-system support terminal and the second-system support terminal; in the assignment target terminal, receiving a first-system broadcast signal, a control channel and a first-system dynamic broadcast signal and preparing a preamble transmission of random access channel, where the first-system broadcast signal, the control channel and the control channel and the first-system dynamic broadcast signal are transmitted from the second-system support base station in an initial access unit band including the searched frequency position of the synchronization channel and can be interpreted by the first-system support terminal and the second-system support terminal; transmitting the preamble of random access channel using a resource corresponding to random access channel resource information included in the first-system dynamic broadcast signal and transmitted from the second-system support base station; in the second-system support base station, reporting resource allocation information to the assignment target terminal in the control channel upon receiving the preamble of random access channel; in the assignment target terminal, reporting terminal capability information of the terminal to the second-system support base station using a resource indicated by the resource allocation information; and in the second-system support base station, when the terminal capability information indicates the second-system support terminal, assigning a unit band different from the initial access unit band as the used unit band and commanding the reception band to be moved by transmitting the assignment information to the assignment target terminal.

The downlink data communication method of the present invention including the above band assignment method, includes: starting a data reception in the destination unit band after the assignment target terminal moves the reception band to the destination unit band; and, in the assignment target terminal that started the data reception, receiving a control channel transmitted from the second-system support base station in the destination unit band and a second-system dynamic broadcast signal that can be received based on the control channel.

Advantageous Effects of Invention

According to the present invention, it is possible to a base station, terminal, band assignment method and downlink data communication method for realizing a method of mapping synchronization signals and broadcast signals having high use efficiency of resources, in a case where there are a first system in which single communication is independently assigned every unit band having a predetermined bandwidth and a second system in which single communication can be assigned a plurality of unit bands.

DETAILED DESCRIPTION

As described above, an LTE+ base station needs to support an LTE terminal and therefore transmits a primary SCH ("P-SCH"), secondary SCH ("S-SCH"), primary BCH ("P-BCH") and dynamic BCH ("D-BCH") used in the LTE terminal, according to the LTE standard. Here, the P-SCH and S-SCH correspond to a first system synchronization signal, the P-BCH corresponds to a first-system broadcast signal, and the D-BCH corresponds to a first-system dynamic broadcast signal.

Further, the LTE+ base station needs to support an LTE+ terminal too. Therefore, the LTE+ base station needs to transmit a primary SCH+ ("PSCH+"), secondary SCH+ ("S-SCH+"), primary BCH+ ("P-BCH+") and dynamic BCH+ ("D-BCH+") used in the LTE+ terminal. Here, the P-SCH+ and S-SCH+ corresponds to a second system synchronization signal, the P-BCH+ corresponds to a second system broadcast signal and the D-BCH+ corresponds to a second system dynamic signal.

Figure 1:
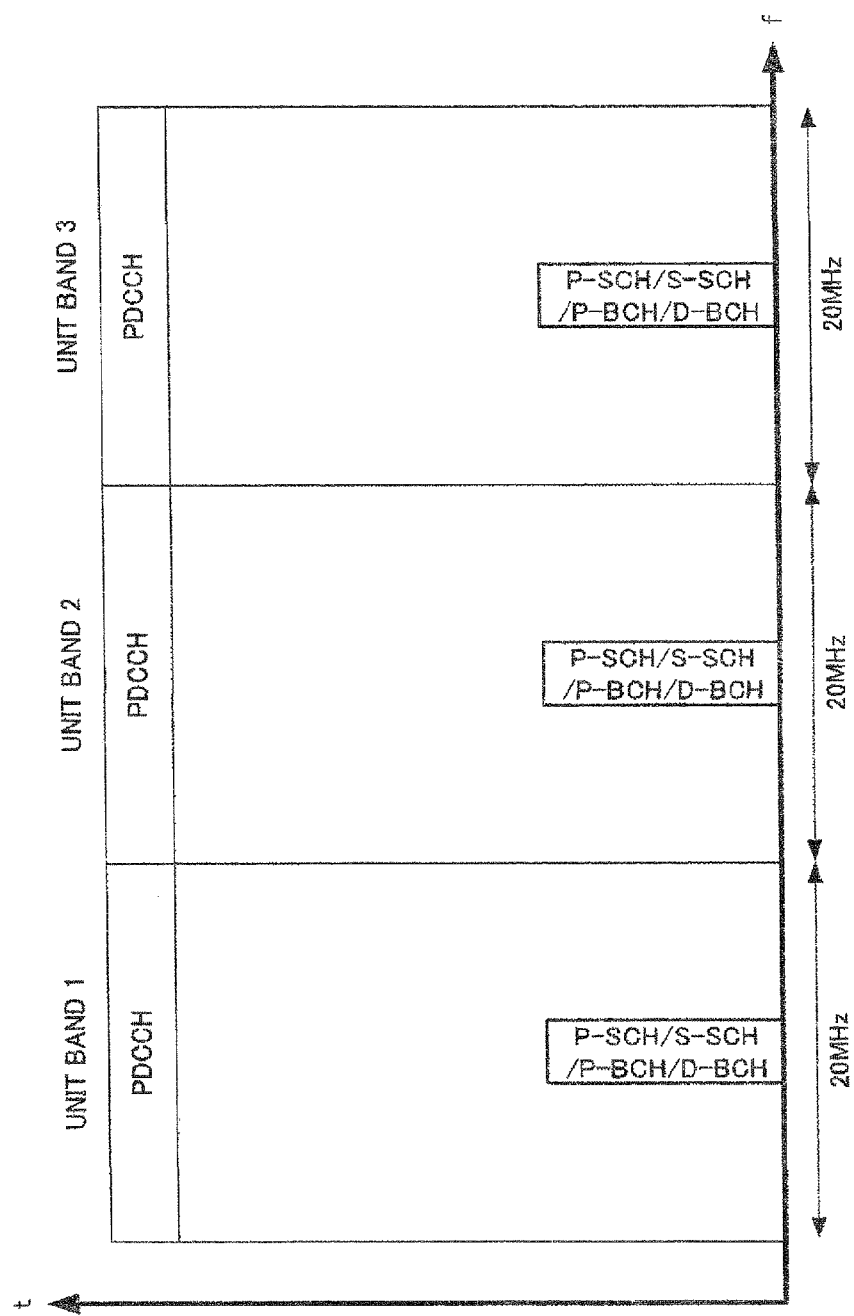
FIG. 1 shows an example of mapping an SCH and BCH in an LTE+ system support base station.
Figure 2:
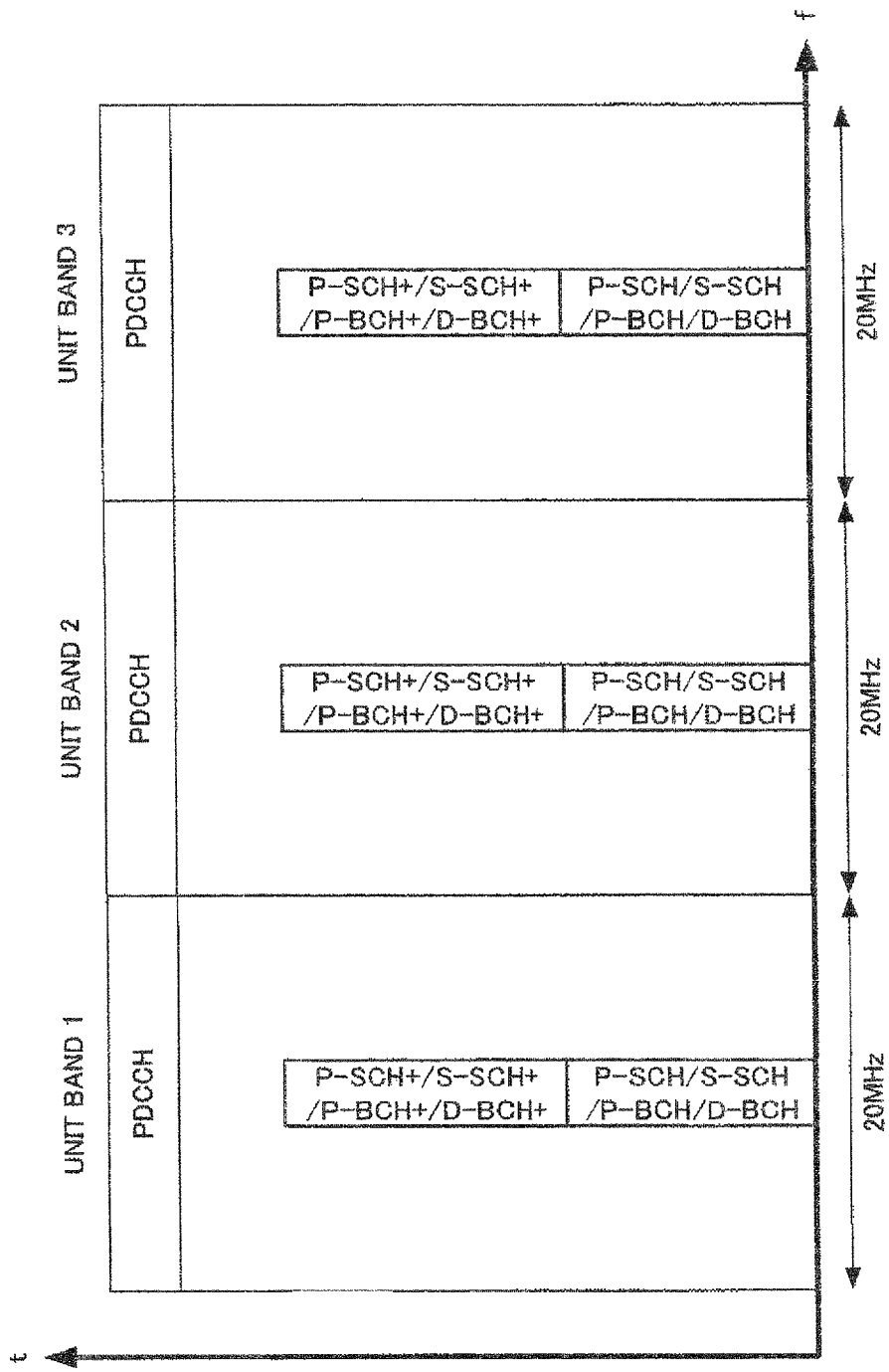
FIG. 2 shows an example of mapping an SCH and BCH in an LTE+ system support base station.

Therefore, first, the present inventors have thought of a mapping method for mapping an SCH+ and BCH+ on the mapping frequency for SCH's and BCH's shown in FIG. 1 (see FIG. 2).

According to the mapping method shown in FIG. 2, an LTE terminal and an LTE+ terminal having 20-MHz terminal capability can receive an SCH and BCH (SCH+ and BCH+) in all bands. Therefore, the LTE terminal and LTE+ terminal can be present at the same time in all bands, so that it is expected to smooth the data traffic in an integrated communication system.

However, as clear from FIG. 2, compared to the LTE system, downlink resources used for SCH and BCH transmission increases, and, consequently, the use efficiency of resources degrades.

Therefore, to improve the use efficiency of resources, a method is proposed to map an SCH and BCH (SCH+ and BCH+) on only a part of unit bands included in the communication band of the LTE+ terminal.

Figure 3:
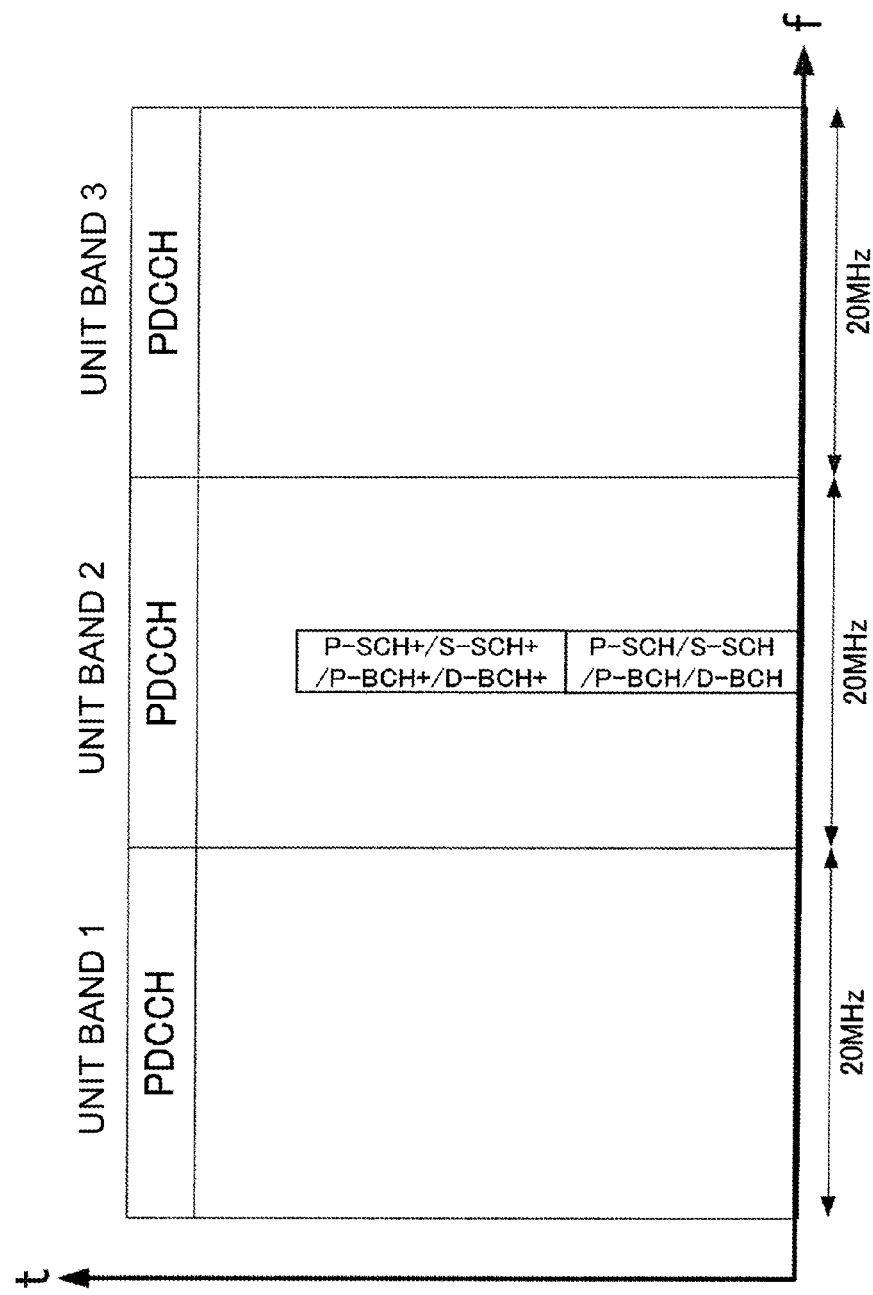
FIG. 3 is a conceptual diagram in which an LTE+ base station supporting 60 MHz transmits an SCH and BCH only in part of unit bands.

FIG. 3 is a conceptual diagram of transmitting an SCH and BCH only in part of unit bands in an LTE+ base station supporting 60 MHz. Here, an SCH and BCH are transmitted only in the center unit band (unit band 2 in FIG. 3) among a plurality of unit bands included in the communication band of the LTE+ terminal. By this means, resources required to transmit an SCH and BCH are reduced.

However, in this case, a terminal supporting up to 20 MHz (including an LTE terminal and LTE+ terminal) cannot access unit band 1 and unit band 3. Consequently, if the number of LTE+ terminals supporting 40 MHz or 60 MHz is small, unit bands at both ends may not be used, and a problem arises that the use efficiency of resources is degraded.

After recognizing the above problems, first, an LTE+ terminal also needs to access an LTE base station, the present inventors focus on the fact that the LTE+ terminal has capability of receiving an SCH and BCH for an LTE terminal.

Further, the present inventors focus on the fact that, when the single LTE+ base station supports an LTE terminal and LTE+ terminal, the content of broadcast signals related to the system in each unit band (e.g., the number of antenna ports, system band, and so on) is very similar.

Focusing the above points, the present inventors have arrived at the present invention.

Now, embodiments of the present invention will be explained in detail with reference to the accompanying drawings. Also, in embodiments, the same components will be assigned the same reference numerals and their overlapping explanation will be omitted.

Embodiment 1

The communication system according to Embodiment 1 of the present invention is the integrated communication system including a first system in which single communication is independently assigned every unit band having a predetermined bandwidth and a second system which follows the first system and in which a plurality of unit bands can be assigned in single communication. An example case will be explained below where the first system is an LTE system and a second system is an LTE+ system.

[Terminal Configuration]

Figure 4:
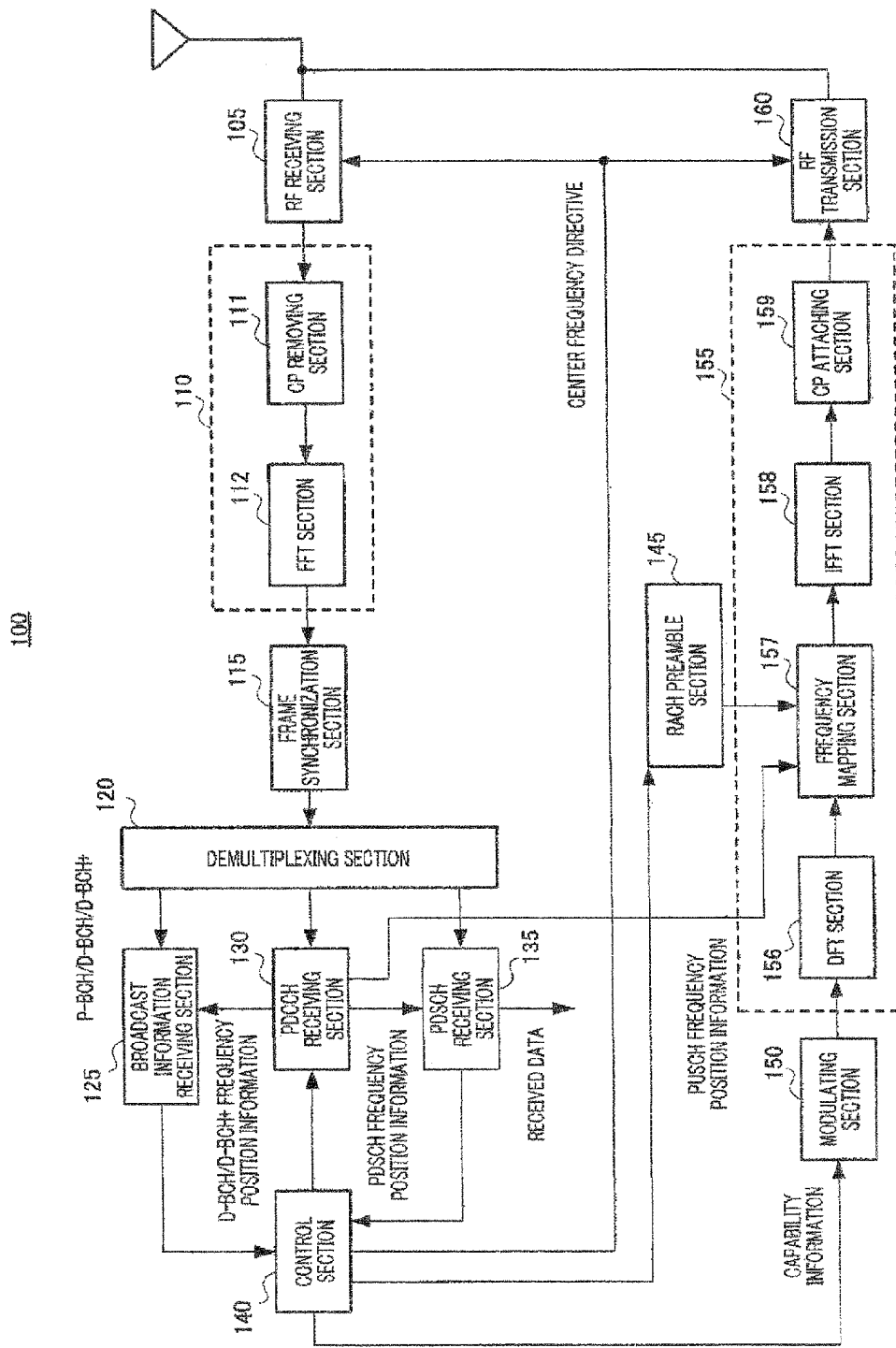
FIG. 4 is a block diagram showing a configuration of a terminal according to Embodiment 1 of the present invention.

FIG. 4 is a block diagram showing a configuration of terminal 100 according to Embodiment 1 of the present invention. Terminal 100 represents an LTE+ terminal. In FIG. 4, terminal 100 is provided with RF receiving section 105, OFDM signal demodulating section 110, frame synchronization section 115, demultiplexing section 120, broadcast information receiving section 125, PDCCH receiving section 130, PDSCH (Physical Downlink Shared CHannel) receiving section 135, control section 140, RACH (Random Access CHannel) preamble section 145, modulating section 150, SC-FDMA (Single-Carrier Frequency Division Multiple Access) signal forming section 155 and RF transmission section 160.

RF receiving section 105 is formed to be able to change a reception band. RF receiving section 105 receives a center frequency indication from control section 140 and, by moving the center frequency based on this center frequency indication, moves the reception band. RF receiving section 105 performs radio reception processing (such as down-conversion and analog-to-digital (A/D) conversion) on a radio reception signal received in the reception band via an antenna, and outputs the resulting reception signal to OFDM signal demodulating section 110. Also, here, although the center frequency of the reception band is used as a base frequency, it is equally possible to use an arbitrary frequency included in the reception band as the base frequency.

OFDM signal demodulating section 110 has CP (Cyclic Prefix) removing section 111 and fast Fourier Transform (FFT) section 112. OFDM signal demodulating section 110 receives the reception OFDM signal from RF receiving section 105. In OFDM signal demodulating section 110, CP removing section 111 removes a CP from the reception OFDM signal and FFT section 112 transforms the reception OFDM signal without a CP into a frequency domain signal. This frequency domain signal is outputted to frame synchronization section 115.

Frame synchronization section 115 searches for a synchronization signal (SCH) included in the signal received from OFDM signal demodulating section 110 and finds synchronization with base station 200 (described later). A unit band included in the found synchronization signal (SCH) is used as the initial access unit band. The synchronization signal includes a P-SCH (Primary SCH) and S-SCH (Secondary SCH). To be more specific, frame synchronization section 115 searches for the P-SCH and finds synchronization with base station 200 (described later).

After finding the P-SCH, frame synchronization section 115 performs blind detection of the S-SCH placed in resources having a predetermined relationship with resources in which the P-SCH is placed. By this means, it is possible to find more precise synchronization and obtain the cell ID associated with the S-SCH sequence. That is, frame synchronization section 115 performs the same processing as in a normal cell search.

Frame synchronization section 115 outputs frame synchronization timing information related to the synchronization establishment timing, to demultiplexing section 120.

Demultiplexing section 120 demultiplexes the reception signal received from OFDM signal demodulating section 110 into the broadcast signal, control signal (i.e., PDCCH signal) and data signal (i.e., PDSCH signal) included in this reception signal, based on the frame synchronization timing information. The broadcast signal is outputted to broadcast information receiving section 125, the PDCCH signal is outputted to PDCCH receiving section 130, and the PDSCH signal is outputted to PDSCH receiving section 135. Here, the PDSCH includes individual information for a given terminal.

Broadcast information receiving section 125 reads the content of the input P-BCH and obtains information related to the number of antennas of base station 200 (described later) and downlink system bandwidth. This information is outputted to control section 140.

Broadcast information receiving section 125 receives a D-BCH signal placed in resources indicated by D-BCH (Dynamic BCH) resource position information (D-BCH frequency position information in this case) included in the PDCCH signal and extracted in PDCCH receiving section 130, and obtains information included in this received D-BCH signal (e.g., information about the frequency and frequency band of uplink pair band or PRACH (Physical Random Access CHannel)). This information is outputted to control section 140. Also, in this specification, an example case will be explained using frequency as resources.

Based on the frequency position related to the decoding indication from control section 140, PDCCH receiving section 130 extracts information (including the frequency position in which the D-BCH and D-BCH+ are placed, the frequency position in which the PDSCH is placed, and uplink frequency allocation information (PUSCH frequency position information in this case)), included in the PDCCH signal received from demultiplexing section 120. Out of this extracted information, the D-BCH and D-BCH+ are outputted to broadcast information receiving section 125, information of the frequency position in which the PDSCH is placed is outputted to PDSCH receiving section 135, and the uplink frequency allocation information is outputted to SC-FDMA signal forming section 155. Here, the information of the frequency position in which the D-BCH is placed and the information of the frequency position in which the PDSCH is placed are extracted before RACH preamble transmission, the uplink frequency allocation information is outputted after RACH preamble transmission, and the information of the frequency position in which the D-BCH+ is placed is extracted after the start of data signal reception. That is, only the information of the frequency position in which the D-BCH+ is placed is extracted in the destination unit band, and the rest of the information is extracted in the initial access unit band.

PDSCH receiving section 135 extracts a band moving indication from the PDSCH signal received from demultiplexing section 120, based on the information about the frequency position in which the PDSCH is placed, received from PDCCH receiving section 130. Then, the extracted band moving indication is outputted to control section 140.

Here, the band moving indication includes all information required to start communication in the destination unit band. The band moving indication includes, for example, information about the destination unit band and pair uplink bands, the center frequency of the destination unit band (which corresponds to the center frequency of a PDCCH for the LTE+ terminal), and information required for reading a PDCCH and PDSCH in the destination unit band (i.e., information of the frequency position in which the PDCCH and PDSCH are placed). Here, in order to reduce the signaling amount required for the band moving indication, the center frequency of the destination unit band to adjust in RF receiving section 105 of the LTE+ terminal is reported as a multiple of 300 KHz, which is the lowest common multiple of the downlink subcarrier bandwidth (15 KHz) and the minimum resolution of frequency that can be set by RF receiving section 105 of terminal 100 (100 KHz). This is because, when an LTE+ base station transmits a plurality of SCH's using one IFFT circuit, the interval between SCH's is nothing but an integral multiple of 15 KHz, and, furthermore, needs to be a multiple of 100 KHz to adjust the center frequency of a reception band for any SCH on the terminal side.

Control section 140 sequentially changes the reception band of RF receiving section 105 before synchronization is established. Also, control section 140 prepares RACH preamble transmission, based on the LTE broadcast signal, control channel and LTE dynamic broadcast signal which can be interpreted by the LTE terminal and LTE+ terminal and which are transmitted from base station 200 (described later) in the initial access unit band including the frequency position of the synchronization channel after synchronization is established and before an RACH preamble is transmitted. Also, after RACH preamble transmission, control section 140 obtains report resource assignment information reported by the control channel from base station 200 (described later), transmits terminal capability information of that terminal using resources indicated by that report resource assignment information, and, based on a band moving indication transmitted from base station 200 according to the terminal capacity information, changes the reception band from the initial access unit band to the unit band in use.

To be more specific, control section 140 identifies PDCCH placement information based on the information obtained in broadcast information receiving section 125. This PDCCH placement information is uniquely determined by the number of antennas and downlink system bandwidth of base station 200 (described later). Control section 140 outputs the PDCCH placement information to PDCCH receiving section 130 and commands decoding of a signal placed in the frequency position according to that information.

Also, control section 140 commands RACH preamble section 145 to transmit an RACH preamble according to information included in the D-BCH signal received from broadcast information receiving section 125, that is, according to the uplink frequency band and PRACH frequency position.

Also, upon receiving the uplink frequency allocation information from PDCCH receiving section 130, control section 140 outputs terminal capability information (i.e., capability information) of that terminal to modulating section 150 and outputs the uplink frequency allocation information to SC-FDMA signal forming section 155. By this means, the terminal capability information is mapped on frequency corresponding to the uplink frequency allocation information and then transmitted.

Also, based on the band moving indication received from PDSCH receiving section 135, control section 140 outputs a center frequency indication to RF receiving section 105 such that the reception band of RF receiving section 105 matches the destination band. Here, upon performing move control of the reception band based on that band moving indication, control section 140 outputs a decoding indication to PDCCH receiving section 130. By this means, PDCCH receiving section 130 can receive the PDCCH signal in the destination unit band. By specifying frequency in which the D-BCH+ is placed from the PDCCH signal in that destination unit band, broadcast information receiving section 125 can receive the D-BCH+ placed in the destination unit band. Then, the decoding indication is outputted after the start of data signal reception in PDSCH receiving section 135.

Also, when sequential data communication with base station 200 (described later) is finished (i.e., when there is no data to transmit to the sides of base station 200 and terminal 100), control section 140 switches the mode of terminal 100 to an idle mode. At this time, control section 140 moves the reception band of terminal 100 from the destination unit band to the initial access unit band. By this means, terminal 100 can receive an SCH and BCH even in the idle mode, so that it is possible to start new communication smoothly.

According to the indication from control section 140, RACH preamble section 145 outputs an RACH preamble sequence and information related to the uplink frequency band and PRACH frequency position included in that indication, to SC-FDMA signal forming section 155.

Modulating section 150 modulates the terminal capability information received from control section 140 and outputs the resulting modulation signal to SC-FDMA signal forming section 155.

SC-FDMA signal forming section 155 forms an SC-FDMA signal from the modulation signal received from modulating section 150 and the RACH preamble sequence received from RACH preamble section 145. In SC-FDMA signal forming section 155, discrete Fourier transform (DFT) section 156 transforms the input modulation signal on the frequency axis and outputs a plurality of resulting frequency components to frequency mapping section 157. These plurality of frequency components are mapped on frequency based on the uplink frequency allocation information in frequency mapping section 157 and transformed into a time domain waveform in IFFT section 158. The RACH preamble sequence is also mapped on frequency based on the uplink frequency allocation information in frequency mapping section 157 and transformed into a time domain waveform in IFFT section 158. CP attaching section 159 attaches a CP to the time domain waveform and provides an SC-FDMA signal.

RF transmission section 160 performs radio transmission processing on the SC-FDMA signal formed in SC-FDMA signal forming section 155 and transmits the result via an antenna.

Figure 5:
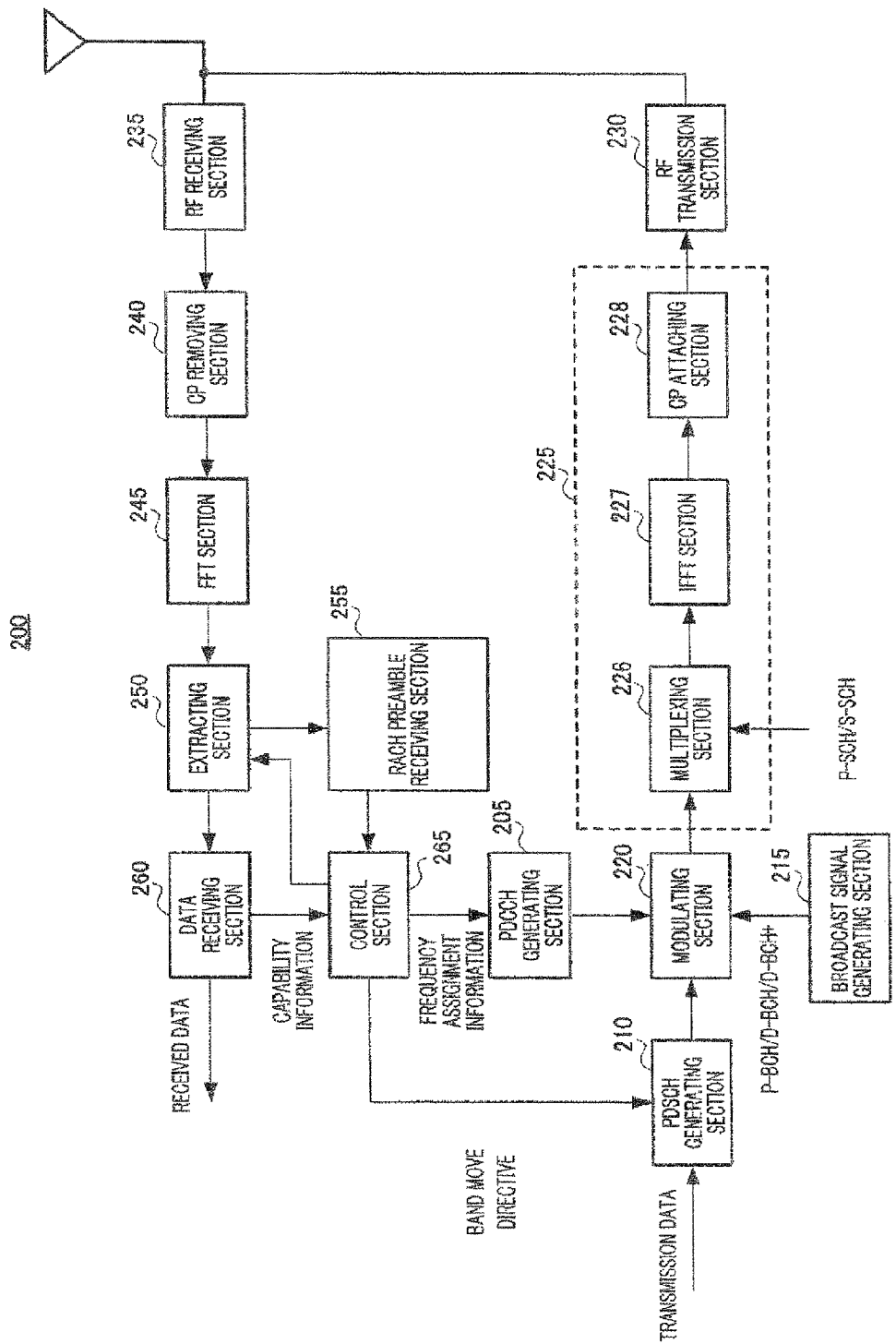
FIG. 5 is a block diagram showing a configuration of a base station according to Embodiment 1 of the present invention.

[Base station configuration] FIG. 5 is a block diagram showing a configuration of base station 200 according to Embodiment 1 of the present invention. Base station 200 is an LTE+ base station. Base station 200 always continues to transmit a P-SCH, S-SCH, P-BCH, D-BCH, D-BCH+, PDCCH representing D-BCH frequency scheduling information and PDCCH representing D-BCH+ frequency scheduling information, in an OFDM scheme.

In FIG. 5, base station 200 is provided with PDCCH generating section 205, PDSCH generating section 210, broadcast signal generating section 215, modulating section 220, OFDM signal forming section 225, RF transmission section 230, RF receiving section 235, CP removing section 240, FFT section 245, extracting section 250, RACH preamble receiving section 255, data receiving section 260 and control section 265. CP removing section 240, FFT section 245, extracting section 250, RACH preamble receiving section 255 and data receiving section 260 form an SC-FDMA signal demodulating section.

PDSCH generating section 205 receives uplink frequency allocation information for terminal 100 and generates a PDCCH signal including this uplink frequency allocation information. PDCCH generating section 205 masks the uplink frequency allocation information by CRC based on an RACH preamble sequence transmitted from terminal 100, and then includes the result in the PDCCH signal. The generated PDCCH signal is outputted to modulating section 220. Here, a sufficient number of RACH preamble sequences are prepared, and the terminal selects an arbitrary sequence from these RACH preamble sequences and accesses the base station. That is, there is an extremely low possibility that a plurality of terminals access base station 200 at the same time using the same RACH preamble sequence, so that, by receiving a PDCCH subjected to CRC masking based on that RACH preamble sequence, terminal 100 can detect uplink frequency allocation information for that terminal without problems.

PDSCH generating section 210 receives a band moving indication from control section 265 and generates a PDSCH signal including this band moving indication. Also, PDSCH generating section 210 receives as input transmission data after transmission of the band moving indication. Then, PDSCH generating section 210 generates a PDSCH signal including the input transmission data. The PDSCH signal generated in PDSCH generating section 210 is received as input in modulating section 220.

Broadcast signal generating section 215 generates and outputs a broadcast signal to modulating section 220. This broadcast signal includes a P-BCH, D-BCH and D-BCH+.

Modulating section 220 forms modulation signals by modulating input signals. These input signals represent the PDCCH signal, PDSCH signal and broadcast signal. The formed modulation signals are received as input in OFDM signal forming section 225.

OFDM signal forming section 225 receives as input the modulation signals and synchronization signals (P-SCH and S-SCH) and forms an OFDM signal in which those signals are mapped on predetermined resources, respectively. In OFDM signal forming section 225, multiplexing section 226 multiplexes the modulation signals and the synchronization signals, and IFFT section 227 obtains a time domain waveform by performing serial-to-parallel conversion and then performing an IFFT of the multiplex signal. By attaching a CP to this time domain waveform in CP attaching section 228, the OFDM signal is provided.

RF transmission section 230 performs radio transmission processing on the OFDM signal formed in OFDM signal forming section 225 and transmits the result via an antenna.

RF receiving section 235 performs radio reception processing (such as down-conversion and analog-to-digital (A/D) conversion) on a radio reception signal received in a reception band via the antenna, and outputs the resulting reception signal to CP removing section 240.

CP removing section 240 removes a CP from the reception SC-FDMA signal and FFT section 245 transforms the reception SC-FDMA signal without a CP into a frequency domain signal.

Extracting section 250 extracts a signal mapped on resources corresponding to the RACH, from the frequency domain signal received from FFT section 245, and outputs the extracted signal to RACH preamble receiving section 255. This extraction of the signal mapped on the resources corresponding to the RACH is always performed so that an LTE+ terminal transmits an RACH preamble to base station 200 at any timing.

Also, extracting section 250 extracts a signal corresponding to uplink frequency allocation information received from control section 265, and outputs this signal to data receiving section 260. This extracted signal includes, for example, terminal capability information transmitted by terminal 100 in a PUSCH.

First, RACH preamble receiving section 255 transforms the extracted signal received from extracting section 250 into a single carrier signal. That is, RACH preamble receiving section 255 includes an inverse discrete Fourier transform (IDFT) circuit. Then, RACH preamble receiving section 255 finds correlation between the resulting single carrier signal and an RACH preamble pattern, and, if the correlation value is equal to or greater than a certain level, decides that an RACH preamble is detected. Then, RACH preamble receiving section 255 outputs an RACH detection report including pattern information of the detected RACH preamble (e.g., the sequence number of the RACH preamble) to control section 265.

Data receiving section 260 transforms the extracted signal received from extracting section 250 into a single carrier signal on the time axis and outputs terminal capability information included in the resulting single carrier signal to control section 265. Also, after transmission of the band moving indication, data receiving section 260 outputs the resulting single carrier signal to a higher layer as reception data.

Upon receiving the RACH detection report from RACH preamble receiving section 255, control section 265 allocates uplink frequency to terminal 100 having transmitted the detected RACH preamble. This allocated uplink frequency is used to, for example, transmit terminal capability information in terminal 100. Then, the uplink frequency allocation information is outputted to PDCCH generating section 205.

Also, upon receiving the terminal capability information from data receiving section 260, control section 265 decides whether the transmission source terminal is the LTE terminal or the transmission source terminal is the LTE+ terminal, based on the terminal capability information. If it is decided as the LTE+ terminal, control section 265 forms a band moving indication for this LTE+ terminal and outputs this band moving indication to PDSCH generating section 210. The band moving indication is formed depending on the density condition in each band. Here, as described above, this band moving indication includes information about the difference from the center frequency position in the RF receiving section of the terminal. This difference information has the value that is an integral multiple of 300 KHz. Also, the band moving indication includes PDCCH and PDSCH placement position information in the destination unit band. Similar to normal downlink data, the band moving indication is prepared for each terminal in PDSCH generating section 210 and then received as input in the modulating section.

Also, after outputting the band moving indication, control section 265 controls the PDCCH and PDSCH for the terminal subject to that indication to be placed in the destination unit band.

Also, after finishing sequential data communication with terminal 100 (i.e., after there is no data to transmit to the sides of base station 200 and terminal 100), in a case where some data needs to be transmitted to terminal 100, control section 265 performs transmission using the initial access unit band. This is because, after the end of sequential data communication, terminal 100 is in an idle state by moving the reception band from the destination unit band to the initial access unit band.

[Operations of Terminal 100 and Base Station 200]

[Method of Mapping a Synchronization Signal, Broadcast Signal and Control Channel]

Figure 6:
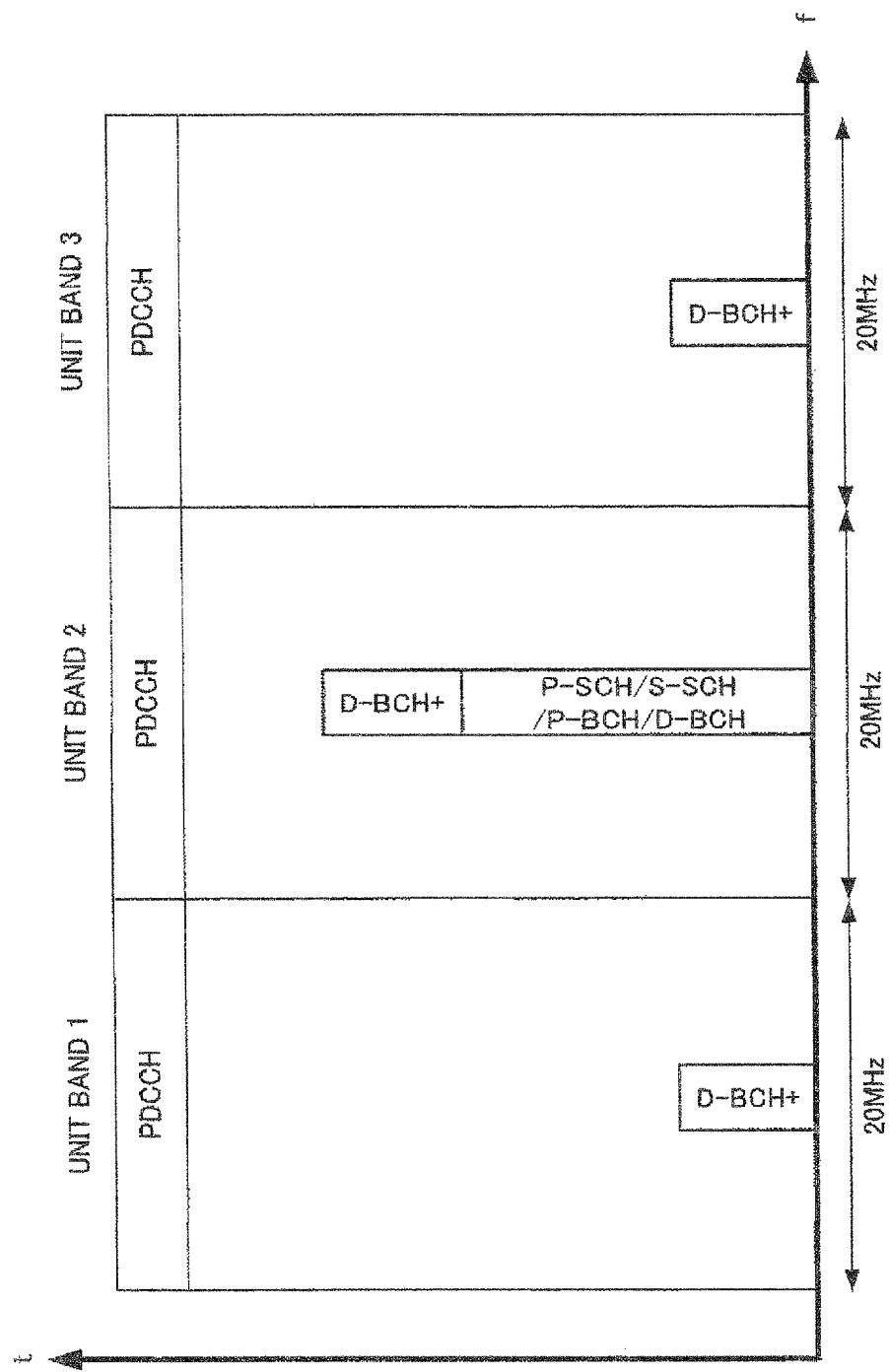
FIG. 6 illustrates a method of mapping a synchronization signal, broadcast signal and control channel in the base station according to Embodiment 1 of the present invention.

FIG. 6 illustrates a method of mapping a synchronization signal, broadcast signal and control channel in base station 200. Base station 200 transmits a synchronization signal, broadcast signal and control channel in the mapping method as shown in FIG. 6.

As shown in FIG. 6, base station 200 provides a plurality of unit bands in the communication band. Here, among the plurality of unit bands, a P-SCH, S-SCH, P-BCH and D-BCH, which can be interpreted by an LTE terminal and LTE+ terminal, are mapped only on part of the unit bands. Further, a D-BCH+ that can be interpreted only by the LTE+ terminal is mapped on all of the plurality of unit bands. Also, the frequency position on which the P-SCH and S-SCH are mapped is the center frequency or near the center frequency of the unit band on which the P-SCH and S-SCH are mapped.

This mapping method represents a mapping method with higher use efficiency of resources than the mapping method shown in FIG. 2. Also, a control channel (PDCCH) indicating frequency position information of the P-SCH, S-SCH, P-BCH, D-BCH and D-BCH+ is always repeatedly transmitted.

(Signal Transmission and Reception between Terminal 100 and Base Station 200)

Figure 7:
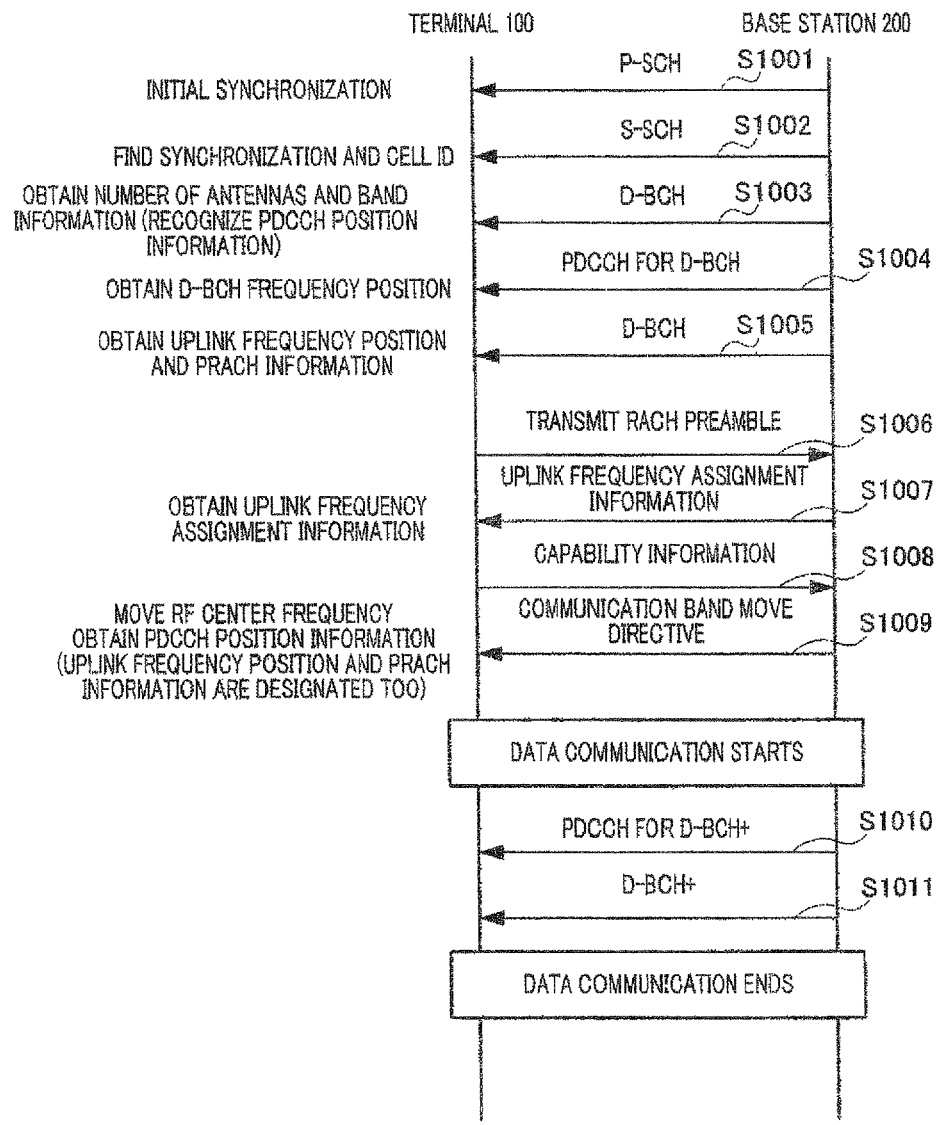
FIG. 7 is a sequence diagram showing signal transmission and reception between a terminal and base station.

FIG. 7 is a sequence diagram showing signal transmission and reception between terminal 100 and base station 200.

In steps S1001 and S1002, a synchronization signal is transmitted, and cell search processing is performed using this synchronization signal. That is, in step S1001, the reception band of RF receiving section 105 is sequentially shifted by control of control section 140, and frame synchronization section 115 searches for a P-SCH. By this means, the initial synchronization is established. Then, in step S1002, frame synchronization section 115 performs blind detection of an S-SCH placed in resources having a predetermined relationship with resources in which the P-SCH is placed. By this means, it is possible to find more precise synchronization and obtain the cell ID associated with the S-SCH sequence.

In step S1003 to step S1005, a broadcast signal and control channel are transmitted and used to prepare RACH preamble transmission.

That is, in step S1003, control section 140 identifies PDCCH placement information based on information included in a received D-BCH signal and obtained in broadcast information receiving section 125 (e.g., information about frequency and frequency band of uplink pair band or PRACH (Physical Random Access CHannel)). Then, control section 140 outputs the PDCCH placement information to PDCCH receiving section 130 and commands decoding of a signal placed in the frequency position based on the information.

In step S1004, according to the decoding indication from control section 140, frequency position information of the D-BCH is extracted in PDCCH receiving section 130.

In step S1005, based on the D-BCH frequency position information, information included in the received D-BCH signal (e.g., information about frequency and frequency band of uplink pair band or PRACH (Physical Random Access CHannel)) is extracted in broadcast information receiving section 125.

In step S1006, under control of control section 140, RACH preamble section 145 transmits an RACH preamble using the uplink frequency band and PRACH frequency position obtained in step S1003.

In step S1007, control section 265 of base station 200 having received the RACH preamble allocates uplink frequency to terminal 100 having transmitted the RACH preamble, and transmits uplink frequency allocation information to that terminal 100.

In step S1008, control section 140 of terminal 100 having received the uplink frequency allocation information transmits terminal capability information of that terminal, using the uplink frequency.

In step S1009, if the received terminal capability indicates the LTE+ terminal, control section 265 transmits a band moving indication.

Terminal 100, having received this band moving indication, shifts the reception band to a unit band indicated by the band moving indication and starts data communication.

In step S1010, control section 140 issues a decoding indication to PDCCH receiving section 130 based on PDCCH position information of the destination unit band, and PDCCH receiving section 130 obtains D-BCH+ frequency position information according to this indication.

In step S1011, broadcast information receiving section 125 extracts information included in the received D-BCH+ based on the D-BCH+ frequency position information.

Here, the above band moving indication includes all information required to read the PDCCH in the destination unit band. Therefore, terminal 100 as the LTE+ terminal needs to read the content of the D-BCH+ to start data communication in the destination unit band.

However, the D-BCH includes information whose parameter content changes depending on the number of terminals that communicate with the base station, such as information related to power control and information of a slot in which it is possible to transmit a sounding reference used to obtain uplink channel information, in addition to information required to start communication.

Such information needs to be read during communication (i.e., active state (which is a state where terminal 100 continues to receive a PDCCH from base station 200 in each subframe)) in terminal 100. Therefore, base station 200 transmits the D-BCH+ including only information required for communication. That is, information that needs not be read by terminal 100 in the active state is reduced, so that it is possible to reduce the size of the D-BCH+. That is, the overhead of resources is reduced.

As described above, according to the present embodiment, in base station 200 as an LTE+ base station, OFDM signal forming section 225 forms a transmission multiplex signal by mapping a P-SCH, S-SCH, P-BCH and D-BCH, which can be interpreted by an LTE terminal and LTE+ terminal, on part of a plurality of unit bands that can be used by that base station, and mapping a D-BCH+ that can be interpreted only by the LTE+ terminal on all of the plurality of unit bands.

By this means, it is possible to transmit a synchronization signal and broadcast signal required for the LTE terminal and LTE+ terminal in a mapping method having high use efficiency of resources.

Also, in base station 200, if a terminal having transmitted terminal capability information is an LTE+ terminal, control section 265 transmits a band moving indication indicating a change of the reception band, to that terminal. By contrast with this, in terminal 100, control section 265 changes the reception band from the initial access unit band to a unit band corresponding to the band moving indication.

By this means, it is possible to equalize the number of terminals that perform communication in each unit band, between unit bands. That is, according to the above mapping method, an LTE terminal accesses only part of the unit bands (i.e., a unit band on which a P-SCH, S-SCH, P-BCH and D-BCH are mapped), and, consequently, LTE terminals tend to be concentrated in that part of the unit bands. Therefore, by shifting the reception band of the LTE+ terminal to a unit band different from the unit band on which the P-SCH, S-SCH, P-BCH and D-BCH are mapped, it is possible to sort terminals into each band in a balanced manner. That is, it is possible to prevent resources from being wasted as caused in the mapping method of FIG. 3.

To be more specific, in terminal 100, RF receiving section 105 is formed to be able to change a reception band, frame synchronization section 115 obtains an SCH, which are placed in a predetermined frequency position and then transmitted from base station 200 and which can be interpreted by an LTE terminal and LTE+ terminal, from a reception signal received in RF receiving section 105, and find synchronization with base station 200, and RACH preamble section 145 transmits an RACH preamble to base station 200 at the timing a preparation of RACH preamble transmission is completed. Then, control section 140 sequentially changes the reception band of RF receiving section 105 and, after synchronization establishment and before RACH preamble transmission, prepares RACH preamble transmission based on a P-BCH, PDCCH and D-BCH which can be interpreted by the LTE terminal and the LTE+ terminal and which are transmitted from base station 200 in the initial access unit band including the synchronization channel frequency position. Further, after RACH preamble transmission, control section 140 obtains report resource allocation information reported by a PDCCH from base station 200, transmits terminal capability information of that terminal using resources indicated by this report resource allocation information, and, based on a band moving indication transmitted in base station 200 according to the terminal capability information, changes the reception band from the initial access unit band.

Also, the band moving indication transmitted from base station 200 includes information required to start data communication in the destination unit band. To be more specific, the band moving indication includes the extension of PDCCH in the frequency axis direction, the number of antennas of the base station in the destination band (i.e., the number of antennas to transmit a reference signal) and the number of OFDM resources used for others than PDCCH's (e.g., a response signal to an uplink data signal).

By this means, even if terminal 100 is moved to a unit band on which a P-SCH, S-SCH, P-BCH and D-BCH are not mapped, terminal 100 can start data communication without problems.

Also, according to the above mapping method, a D-BCH+ is necessarily mapped on the destination band of terminal 100. This D-BCH+ includes information required to continue communication in an LTE+ terminal. Therefore, terminal 100 can continue stable communication in the destination unit band.

Also, although a case has been described above where terminal 100 independently changes the RF center frequency and shifts to an idle mode when sequential data communication with base station 200 is finished, the present invention is not limited to this, and, when sequential data communication between terminal 100 and base station 200 is finished, terminal 100 may be moved to the initial access unit band by transmitting a band moving indication again from base station 200 to terminal 100.

Embodiment 2

In Embodiment 2, an LTE+ base station maps a reference signal, which can be interpreted only by an LTE+ terminal, on a unit band different from a unit band on which an LTE broadcast signal and LTE dynamic broadcast signal are mapped. Then, in the destination unit band, the LTE+ terminal measures the reception strength of the above reference signal and prepares for handover. Also, the basic configurations of the terminal and base station according to the present embodiment are the same as the configurations of the terminal and base station explained in Embodiment 1.

Therefore, the terminal according to the present embodiment will be also explained using FIG. 4 and FIG. 5.

Figure 8:
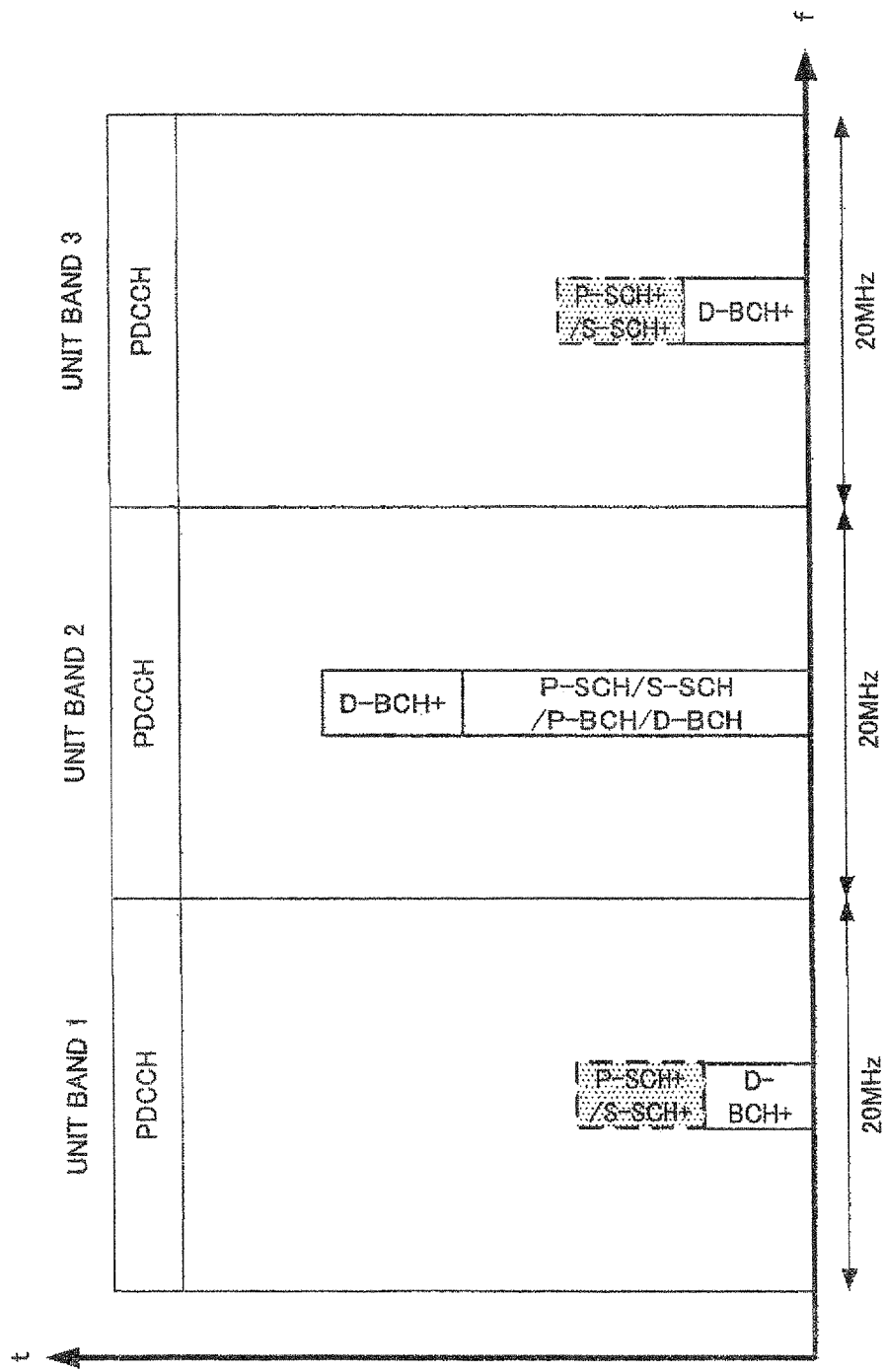
FIG. 8 illustrates a method of mapping a synchronization signal, broadcast signal and control channel in a base station according to Embodiment 2 of the present invention.

In base station 200 according to Embodiment 2, similar to Embodiment 1, OFDM signal forming section 225 maps a P-SCH, S-SCH, P-BCH and D-BCH, which can be interpreted by an LTE terminal and LTE+ terminal, on part of a plurality of unit bands that can be used by that base station, and maps a D-BCH+ that can be interpreted only by the LTE+ terminal on all of the plurality of unit bands. Furthermore, OFDM signal forming section 225 maps a reference signal that can be interpreted by the LTE+ terminal on a unit band different from the unit band on which the P-SCH, S-SCH, P-BCH and D-BCH are mapped. As this reference signal, specifically, a synchronization signal (P-SCH+, S-SCH+) that can be interpreted only by the LTE+ terminal is used. That is, base station 200 according to Embodiment 2 transmits a synchronization signal, broadcast signal and control channel in the mapping method as shown in FIG. 8.

Also, in terminal 100 according to Embodiment 2, broadcast information receiving section 125 receives a reference signal transmitted from an LTE+ base station different from base station 200 that is the data communicating party in the destination unit band.

Then, a measurement section (not shown) provided in control section 140 measures the reception strength of the reference signal received in broadcast information receiving section 125.

Figure 9:
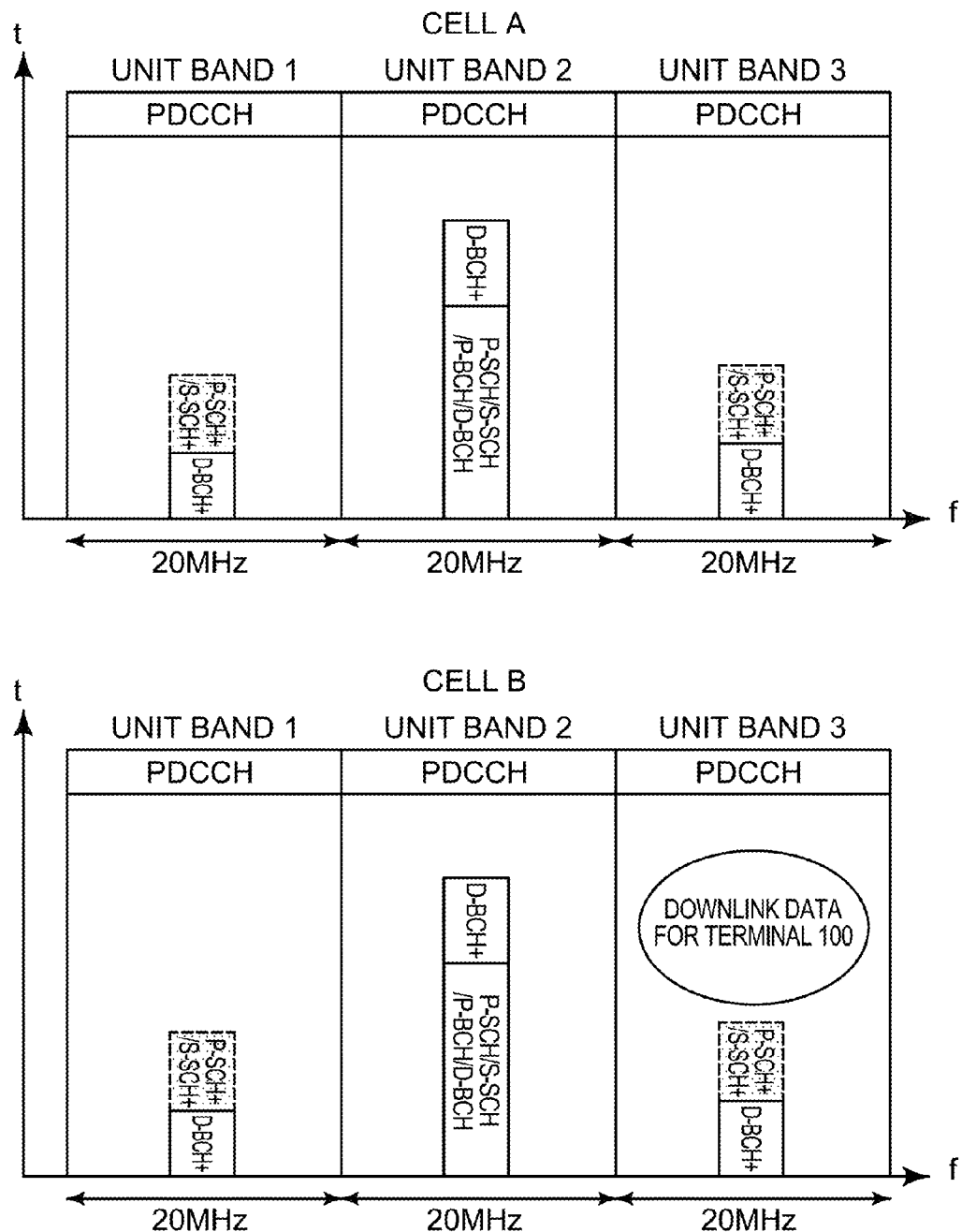
FIG. 9 illustrates operational explanation of a terminal according to Embodiment 2 of the present invention.

Operations of terminal 100 having the above configuration will be explained. FIG. 9 illustrates the operations of terminal 100 according to Embodiment 2. In FIG. 9, adjacent cells A and B have the same communication band.

Now, terminal 100 is moved to unit band 3 in cell B (which is a cell of base station 200) and then performs data communication. At this time, an LTE+ base station in cell A transmits a reference signal (P-SCH+, S-SCH+) in unit band 3. Therefore, terminal 100 can receive the reference signal (P-SCH+, S-SCH+) transmitted from adjacent cell A. Therefore, terminal 100 can measure the reception strength of the reference signal transmitted from adjacent cell A while performing data communication with base station 200. That is, it is possible to simultaneously implement measurement processing for adjacent cell A and reception of downlink data from cell B, which are performed for handover preparation. By this means, the power consumption of terminal 100 is reduced.

Also, in a subframe (i.e., an area defined by a predetermined frequency bandwidth and predetermined time length), the number of symbols on which the reference signal (P-SCH+, S-SCH+) is mapped may be smaller than the number of symbols on which a P-SCH and S-SCH are mapped. In this case, information about the number of symbols on which the reference signal (P-SCH+, S-SCH+) is mapped in a subframe is shared between adjacent LTE+ base stations. Then, to ease measurement processing of a reference signal transmitted in the adjacent cell, base station 200 may explicitly report transmission position information (frequency, time) of the reference signal (P-SCH+, S-SCH+) in the adjacent cell to terminal 100 or implicitly report the transmission position information by issuing an indication to perform measurement in the corresponding frequency at the timing the adjacent cell transmits the reference signal.

Although example cases have been described above with Embodiments 1 to 4 where the present invention is implemented with hardware, the present invention can be implemented with software.

Furthermore, each function block employed in the description of each of Embodiments 1 to 4 may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI' s, and implementation using dedicated circuitry or general purpose processors is also possible. After LSI manufacture, utilization of an FPGA (Field Programmable Gate Array) or a reconfigurable processor where connections and settings of circuit cells in an LSI can be regenerated is also possible.

Further, if integrated circuit technology comes out to replace LSI' s as a result of the advancement of semiconductor technology or a derivative other technology, it is naturally also possible to carry out function block integration using this technology.

Application of biotechnology is also possible.

The disclosure of Japanese Patent Application No. 2008-201005, filed on Aug. 4, 2008, including the specification, drawings and abstract, is incorporated herein by reference in its entirety.

INDUSTRIAL APPLICABILITY

The base station, terminal, band assignment method and downlink data communication method of the present invention are useful to realize a method of mapping a synchronization signal and broadcast signal having high use efficiency of resources, in a case where there are a first system in which single communication is independently assigned every unit band having a predetermined bandwidth and a second system which follows the first system and in which a plurality of unit bands can be assigned in single communication.

The invention claimed is:

1. An integrated circuit for communication performed by a base station that can communicate with a user equipment on a plurality of component carriers in a first system, the first system being different from a second system where another user equipment can communicate on a single component carrier of the plurality of component carriers, the integrated circuit comprising:
   generating circuitry, which, in operation, generates directive information, the directive information being necessary for the user equipment to receive a PDCCH (Physical Downlink Control Channel) in a second component carrier that is to be added to and is different from a first component carrier, the first component carrier being a component carrier in which synchronization is performed by the user equipment, and the directive information including a downlink frequency bandwidth of the second component carrier, a number of antennas for use in the second component carrier, and resources used to transmit a response signal in the second component carrier responsive to an uplink data signal; and
   transmitting circuitry, which, in operation, controls transmission of the directive information to the user equipment in the first component carrier on a PDSCH (Physical Downlink Shared Channel) and transmission of the PDCCH to the user equipment in the second component carrier that occurs after the transmission of the directive information.

2. The integrated circuit according to claim 1, comprising:
   at least one input coupled to the generating circuitry, wherein the at least one input, in operation, inputs data; and
   at least one output coupled to the transmitting circuitry, wherein the at least one output, in operation, outputs data.

3. The integrated circuit according to claim 1, wherein, the second component carrier does not include a synchronization signal.

4. The integrated circuit according to claim 1, wherein the first system is a LTE Advanced system, and the second system is a LTE system.

5. The integrated circuit according to claim 1, wherein a maximum bandwidth supported in the first system is over 20 MHz, and a maximum bandwidth supported in the second system is 20 MHz.

6. The integrated circuit according to claim 1, wherein a maximum bandwidth of the plurality of component carriers is over 20 MHz, and a maximum bandwidth of the single component carriers is 20 MHz.

7. The integrated circuit according to claim 2, wherein the at least one output and the at least one input, in operation, are coupled to an antenna.

8. An integrated circuit for communication performed by a base station that can communicate with a user equipment on a plurality of component carriers in a first system, the first system being different from a second system where another user equipment can communicate on a single component carrier of the plurality of component carriers, the integrated circuit comprising:
   at least one input, which, in operation, inputs data; and
   circuitry coupled to the at least one input, the circuitry being operative to:
   generate directive information, the directive information being necessary for the user equipment to receive a PDCCH (Physical Downlink Control Channel) in a second component carrier that is to be added to and is different from a first component carrier, the first component carrier being a component carrier in which synchronization is performed by the user equipment, and the directive information including a downlink frequency bandwidth of the second component carrier, a number of antennas for use in the second component carrier, and resources used to transmit a response signal in the second component carrier responsive to an uplink data signal; and
   control transmission of the directive information to the user equipment in the first component carrier on a PDSCH (Physical Downlink Shared Channel) and transmission of the PDCCH to the user equipment in the second component carrier that occurs after the transmission of the directive information.

9. The integrated circuit according to claim 8, further comprising at least one output coupled to the circuitry, wherein the at least one output, in operation, outputs data.

10. The integrated circuit according to claim 8, wherein, the second component carrier does not include a synchronization signal.

11. The integrated circuit according to claim 8, wherein the first system is a LTE Advanced system, and the second system is a LTE system.

12. The integrated circuit according to claim 8, wherein a maximum bandwidth supported in the first system is over 20 MHz, and a maximum bandwidth supported in the second system is 20 MHz.

13. The integrated circuit according to claim 8, wherein a maximum bandwidth of the plurality of component carriers is over 20 MHz, and a maximum bandwidth of the single component carriers is 20 MHz.

14. The integrated circuit according to claim 9, wherein the at least one output and the at least one input, in operation, are coupled to an antenna.

* * * * *